(12) United States Patent
Durbecq et al.

(10) Patent No.: US 9,835,386 B2
(45) Date of Patent: Dec. 5, 2017

(54) HEAT EXCHANGER, IN PARTICULAR FOR VEHICLE AIR CONDITIONING LOOPS OR CIRCUITS

(71) Applicant: Valeo Systemes Thermiques, Le Mesnil Saint Denis (FR)

(72) Inventors: Gael Durbecq, Reims (FR); Jean-Baptiste Cuillier, Pouillon (FR)

(73) Assignee: VALEO SYSTEMES THERMIQUES, Le Mesnil Saint Denis (FR)

( * ) Notice: Subject to any disclaimer, the term of this patent is extended or adjusted under 35 U.S.C. 154(b) by 64 days.

(21) Appl. No.: 14/899,475

(22) PCT Filed: Jun. 16, 2014

(86) PCT No.: PCT/EP2014/062558
§ 371 (c)(1),
(2) Date: Dec. 17, 2015

(87) PCT Pub. No.: WO2014/202527
PCT Pub. Date: Dec. 24, 2014

(65) Prior Publication Data
US 2016/0146548 A1 May 26, 2016

(30) Foreign Application Priority Data

Jun. 20, 2013 (FR) .................................... 13 55854

(51) Int. Cl.
*F28F 9/04* (2006.01)
*F28F 1/08* (2006.01)
(Continued)

(52) U.S. Cl.
CPC ................ *F28F 1/08* (2013.01); *B23P 15/26* (2013.01); *F28F 9/0224* (2013.01);
(Continued)

(58) Field of Classification Search
CPC .......... F28F 1/08; F28F 9/0224; F28F 9/0248; B23P 15/26; F28D 1/05391
(Continued)

(56) References Cited

U.S. PATENT DOCUMENTS 6,026,804 A * 2/2000 Schardt .................... F24H 1/40
126/344
7,337,834 B2 * 3/2008 Antonijevic ....... B60H 1/00571
165/154
(Continued)

FOREIGN PATENT DOCUMENTS

DE 10 2006 040 848 A1 3/2007
DE 10 2009 038 297 A1 3/2011
(Continued)

OTHER PUBLICATIONS

International Search Report for Application No. PCT/EP2014/062558 dated Sep. 24, 2014, 7 pages.
(Continued)

*Primary Examiner* — Davis Hwu
(74) *Attorney, Agent, or Firm* — Howard & Howard Attorneys PLLC

(57) ABSTRACT

The present invention relates to a heat exchanger (1) comprising at least, one fluid F passage tube (7) and at least one manifold (5) provided with a cover (11) closing, after assembly, a longitudinal opening (10) of a collector plate (9) cooperating with said cover (11) to form the manifold, said tube (7) being designed to form a connecting element for the exchanger and comprising an end partially crimped between said cover (11) and said collector plate (9) at a passage orifice (17) for said fluid F in the manifold.

16 Claims, 2 Drawing Sheets

(51) Int. Cl.
*F28F 9/02* (2006.01)
*B23P 15/26* (2006.01)
*F28D 1/053* (2006.01)
*F28D 21/00* (2006.01)

(52) U.S. Cl.
CPC ........ *F28F 9/0248* (2013.01); *F28D 1/05391* (2013.01); *F28D 2021/0084* (2013.01)

(58) Field of Classification Search
USPC ........................................................ 165/178
See application file for complete search history.

(56) References Cited

U.S. PATENT DOCUMENTS

| | | | |
|---|---|---|---|
| 8,757,248 B2 * | 6/2014 | Postma | F28D 7/0041 |
| | | | 165/158 |
| 8,985,193 B2 | 3/2015 | Hirsch et al. | |
| 2002/0157817 A1 * | 10/2002 | Mannoni | B29C 65/08 |
| | | | 165/173 |
| 2013/0000876 A1 | 1/2013 | Lavenu et al. | |
| 2013/0319644 A1 | 12/2013 | Moreau et al. | |
| 2014/0190674 A1 | 7/2014 | Moreau | |
| 2014/0299301 A1 | 10/2014 | Dumoutier et al. | |

FOREIGN PATENT DOCUMENTS

| | | |
|---|---|---|
| EP | 1 150 088 A2 | 10/2001 |
| FR | 2 791 766 A1 | 10/2000 |
| FR | 2 951 817 A1 | 4/2011 |
| FR | 2 962 206 A1 | 1/2012 |
| FR | 2 975 764 A1 | 11/2012 |
| FR | 2 978 237 A1 | 1/2013 |
| JP | H 10-238992 A | 9/1998 |

OTHER PUBLICATIONS

English language abstract and machine-assisted English translation for DE 10 2006 040 848 extracted from ?espacenet.com database on Jan. 14, 2016, 22 pages.
English language abstract not found for DE 10 2009 038 297; however, see English language equivalent U.S. Pat. No. 5,985,193. Original document extracted from espacenet.com database on Jan. 14, 2016, 8 pages.
English language abstract and machine-assisted English translation for FR 2 791 766 extracted from espacenet.com database on Jan. 14, 2016, 25 pages.
English language abstract not found for FR 2 951 817; however, see English language equivalent U.S. 2013/0000876. Original document extracted from espacenet.com database on Jan. 14, 2016, 18 pages.
English language abstract not found for FR 2 962 206; however, see English language equivalent U.S. 2013/0319644. Original document extracted from espacenet.com database on Jan. 14, 2016, 14 pages.
English language abstract not found for FR 2 975 764; however, see English language equivalent U.S. 2014/0299301. Original document extracted from espacenet.com database on Jan. 14, 2016, 19 pages.
English language abstract not found for FR 2 978 237; however, see English language equivalent U.S. 2014/0190674. Original document extracted from espacenet.com database on Jan. 14, 2016, 14 pages.
English language abstract for JPH 10-238992 extracted from espacenet.com database on Jan. 14, 2016, 2 pages.

* cited by examiner

HEAT EXCHANGER, IN PARTICULAR FOR VEHICLE AIR CONDITIONING LOOPS OR CIRCUITS

RELATED APPLICATIONS

This application is the National Stage of International Patent Application No. PCT/EP2014/062558, filed on Jun. 16, 2014, which claims priority to and all the advantages of French Patent Application No. FR 13/55854, filed on Jun. 20, 2013, the content of which is incorporated herein by reference.

The present invention relates to a heat exchanger, in particular for vehicle air conditioning loops or circuits.

The heat exchangers concerned are intended, although not exclusively, for vehicles and correspond, in a preferred application, to the condensers provided on vehicle air conditioning loops or circuits. However, other applications can also be considered for these heat exchangers without departing from the scope of the invention.

Generally, a heat exchanger for such a thermal loop comprises a bundle of parallel tubes and two collectors in which the corresponding ends of the tubes are connected in a fixed and sealed manner. Thus, the refrigerant fluid circulating in the loop is able to circulate from the upstream collector turned towards a compressor, towards a downstream collector, through the tubes causing the fluid to pass from the vapour phase to the liquid phase by an external forced airflow, sweeping the tubes of which the surface area, increased by the addition of disruptors or inserts between the tubes, optimises the thermal exchange.

In the case with which we are concerned here, the exchangers are of the type obtained by brazing and the collectors used can therefore be designed in two parts, and are designated by the term "two-part collector or collector box".

This type of collector, the overall shape of which is tubular, has:
a collector plate having a wall that is longitudinally open and provided with slits intended for the corresponding ends of the parallel tubes for fluid circulation; and
a cover which closes, after assembly, the longitudinal opening in the collector plate and in the wall of which there is provided at least one orifice for the inflow and/or outflow of the fluid.

In addition, to provide the connection between each collector and a line of the loop concerned, a connecting flange is fitted to the collector. In certain configurations, in particular in some particularly crowded vehicle engine compartments, the installation of such a flange fitted to the collector is difficult, or cannot even be considered. Thus, it has already been proposed that tubes enabling the flange to be offset from the exchanger be fitted to the collector. However, the solutions already proposed for assembling such tubes on the collector before brazing are not completely satisfactory, in particular in the case of two-part collectors.

The aim of the present invention is to remedy this drawback.

To that end, the heat exchanger according to the invention comprises at least one tube for the passage of fluid and at least one collector provided with a cover which closes, after assembly, a longitudinal opening in a collector plate cooperating with said cover to form the collector.

According to the invention, said tube is intended to form a connecting element of the exchanger and has an end partially crimped between said cover and said collector plate at an orifice for the passage of said fluid into the collector.

In this way, it is possible to perform a simple and reliable pre-assembly of the tube and the exchanger, before brazing. Said tube is fitted to said exchanger, which enables the exchanger to be connected at an offset from the collector.

Said collector plate is advantageously designed to produce the crimping of outer edges of said tube on said cover while placing said tube in fluid communication with said passage orifice.

According to other features of the invention, which can be taken alone or in combination:
said tube is provided at its other end with a connecting element for connecting the exchanger;
the crimping of said tube on said cover is produced by contacting parallel edges, delimiting the longitudinal opening in the collector plate, against said outer edges of the tube;
said outer edges are produced by a deformation, in particular a regular deformation of the end of the tube;
said outer edges are complementary to the cover;
said tube comprises a flange shaped to bear, by at least a portion of said flange, against the cover in a planar manner, said flange comprising said outer edges;
said flange and/or said outer edges are folded;
said flange is fitted to a tubular part forming a main body of the tube, for example the flange can be clinched, crimped, or hot- or cold-formed on the main body;
said flange and/or said outer edges have a single or a double thickness, i.e. a thickness folded on itself in the latter case;
the thickness of said flange or said outer edges corresponds substantially to that of the cover, for example in the range between 0.8 and 1.2 mm;
the cover has a collar which delimits said passage orifice and is intended to be received by said end of the tube;
said collar has a wall of which thickness is reduced in relation to that of said cover from which the collar originates, so as to maximise the section of said orifice for the circulation of fluid towards and/or from the internal passage of said tube and to reduce the internal head loss from passage of the fluid;
said end of the tube is flared, in particular to receive said collar;
said collector plate is provided with slits intended for parallel tubes for fluid circulation;
the wall of the collector plate is provided with internal stops designed to receive the longitudinal edges of said cover and to enable an appropriate pre-assembly placing of the cover on the collector plate;
the cross section of said collector plate is substantially in the shape of a U, in the opening of which said cover, which also has an approximately U-shaped cross section, is inserted;
said collector plate and said cover are fitted top-to-tail with one another;
the external face of the wall of said cover is coated with a plating intended for the subsequent brazing for connecting said cover to said collector plate and said tube.

According to an aspect of the invention, said heat exchanger comprises two collectors connected to one another by a bundle of parallel tubes for the circulation of said fluid. At least one of said collectors, or even both, are as defined above.

The invention also relates to a method for assembling a heat exchanger, comprising the steps of:
shaping the connecting tube in a manner complementary to the outer surface of the cover at the orifice for the passage of fluid into the collector;

positioning the tube on the orifice in the cover for the passage of fluid, then folding the lateral wings of the collector plate onto the cover in order to close the cover on the collector plate and crimping the tube to the cover, thus allowing pre-assembly of the exchanger before it is assembled, for example by brazing or induction.

Other features and advantages of the invention will become apparent on reading the following description of embodiments given as an illustration with reference to the accompanying drawings, in which.

It should be noted that the drawings show the invention in a detailed manner and that they can, of course, be used to better define the invention where necessary.

Lastly, identical reference numbers are used to designate identical or similar elements.

As shown in FIGS. 1 to 4, the invention relates to a heat exchanger 1 that can be, for example, the condenser of an air conditioning loop for the passenger compartment of a vehicle.

Figure 1:
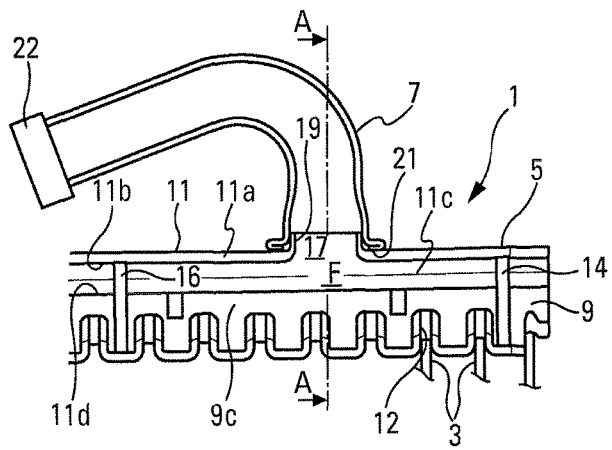
FIG. 1 is a partial view in longitudinal cross section of a heat exchanger according to an embodiment of the invention.

Structurally, the exchanger 1 comprises a bundle of parallel tubes 3, illustrated partially and diagrammatically, the ends of which are connected, in a fixed and sealed manner, to collectors or collector boxes 5 of the exchanger upstream and downstream, respectively, depending on the direction of circulation of the fluid F circulating in the loop concerned. Only one of said collectors 5 is shown in FIG. 1. Said exchanger further comprises one or more fluid connection tubes 7, for example for the inflow and outflow of the fluid of the exchanger.

In particular, the tubes 3 in which the fluid F circulates have an oblong cross section and between these tubes inserts (not shown) are arranged that increase the heat exchange surface area between the fluid circulating in the exchanger and the external airflow passing through said exchanger. The interior of the tubes can also include disruptors which, like the inserts, increase the heat exchange surface area and also the mechanical strength of the tubes. Extruded tubes may also be used. Each tube defines, for example, a plurality of internal, parallel fluid circulation channels.

The upstream and downstream collectors 5 can be identical overall and have a generally tubular shape. They are of a "two-part" type, in other words, each of them consists of a collector plate 9 and a closing cover 11.

Figure 2:
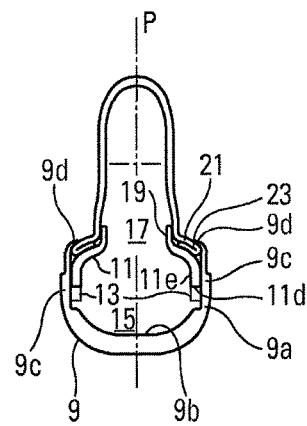
FIG. 2 is a view in cross section, along the line A-A, of the collector and of the tube of the heat exchanger of FIG. 1.
Figure 3:
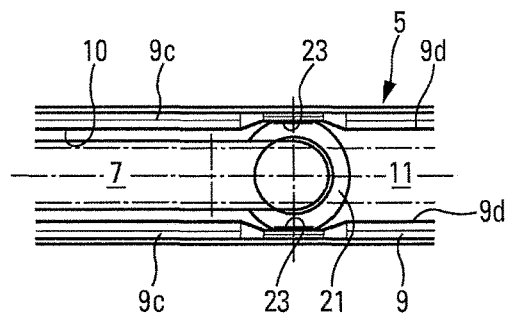
FIG. 3 is a view from above of the heat exchanger of FIG. 1.

As can be seen in FIG. 2, the collector plate 9 has a cross section substantially in the shape of a rounded U and its wall 9a thus defines a bottom 9b extended by two parallel lateral branches or wings 9c, the end edges 9d of which delimit a longitudinal opening 10 closed by the cover 11. In the bottom 9b of the collector plate and along the length thereof oblong slits 12 are made, in which the corresponding ends of the parallel tubes 3 are received.

The cover 11 also has a substantially U-shaped cross section, the wall 11a of which forms a slightly concave bottom 11b extended by parallel lateral branches or wings 11c, shorter than those 9c of the collector plate. The dimension, in particular the width of the cover 11, is such that the lateral branches 11c fit head-to-tail between the lateral branches 9c of the collector plate. The end edges 11d of the lateral branches of the cover can bear against projecting stops 13 provided inside the collector plate.

The collector 5 here has a median plane of symmetry P.

The assembly of the cover 11 and the collector plate 9 defines an internal space 15 of the collector, in which the fluid F of the loop is caused to circulate. The cross section of the collector 5 is therefore approximately rectangular by virtue of the interlocked form of the U shapes of the plate 9 and the cover 11, but it could be different. End partition walls, only one 14 of which is shown, are provided at each of the longitudinal ends of the collector in order to close the collector. Internal partition walls 16 can be used to cause the fluid to circulate in several successive passes in the core.

The bottom 11b of the cover is placed in fluid communication with an orifice 17, here formed by a collar 19 of the cover, which delimits the passage of the fluid from the collector to the tube or vice versa. The collar 19 is provided at the bottom 11b of the cover, for example centrally.

The drawings show the connection of a single tube of the exchanger 1, but it goes without saying that there could be two or more tubes. In particular, in the case of collectors with internal partition walls 16, there could be two tubes on the same tubular collector, at the respective ends thereof, at the fluid inlet and outlet.

Thus, the heat exchanger 1 comprises at least one tube 7 for the passage of fluid F and at least one collector 5 provided with a cover 11 which closes, after assembly, the longitudinal opening 10 in the collector plate 9 cooperating with said cover 11 to form the collector 5.

According to the invention, said tube 7 is intended to form a connecting element of the exchanger, in particular in said air conditioning loop. In order to allow the tube to be pre-fitted to the rest of the exchanger, before brazing, said tube comprises an end partially crimped between said cover 11 and said collector plate 9 at the orifice 17 for passage of said fluid into the collector 5.

In other words, said tube 7 is fitted to said exchanger, which enables the exchanger to be connected at an offset from the collector, for example by a connecting flange 22, at the other end of the tube. In a variant, said tube can be connected to a bottle or reservoir for said fluid.

Said collector plate 9 is designed to produce, more specifically by its lateral wings 9c being folded onto outer edges 23 of said tube, the crimping of the tube onto said cover 11 while placing it in fluid communication with said passage orifice 17 of the cover.

Figure 7:
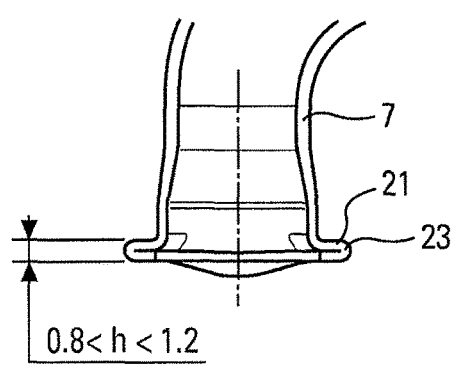
FIG. 7 is a view in transverse cross section of the tube of FIG. 2.

Said outer edges 23 are, for example, produced by a deformation, in particular a regular deformation of the opening edge of the tube. This deformation can result from a shaping of the edge, such as a peripheral stretching of the edge by rolling. This deformation can reduce the thickness of the edge, so that it is expedient to fold it, in particular in two folds applied one on the other, in order to increase the thickness of the joint of the edge with the cover and so that the mechanical rigidity of the connection between said edges and the cover is sufficient, in particular that it is consistent with the other parts of the exchanger. In particular, the thickness of said outer edges 23, as shown in FIG. 7, corresponds substantially to that of the partition wall 11a of the cover. This thickness is, for example, in the range between 0.8 and 1.2 mm.

Figure 4:
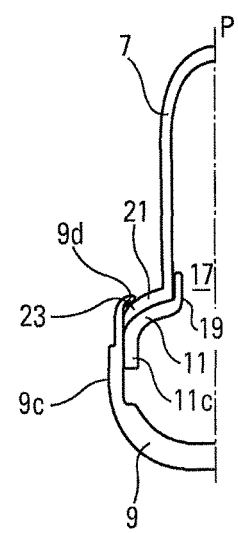
FIGS. 4 to 6 are half-section views, similar to that of FIG. 2, of variants.

Said tube can comprise a flange 21 shaped to bear, by at least a part of the flange, against the cover 11 in a planar manner. The contact surface area of said flange with the cover, in its position at the orifice 17 for passage of the fluid, can be convex, in a manner complementary to the corresponding outer surface of the cover. Said flange 21 is here of double thickness, having a folded-under fold, as can be clearly seen in FIG. 2, but it could be of a single thickness as shown in FIG. 4. Here, it is integral.

Figure 8:
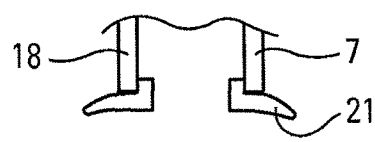
FIG. 8 is a partial view in transverse cross section of the tube according to a variant.

Said flange 21 can also be fixed in a manner fitted to a tubular part 18 forming the main body of the tube 7, as shown in FIG. 8, in particular at its end. The flange can be clinched, crimped, or hot- or cold-formed on the main body 18 of the tube.

In these different embodiments, said outer edges 23 are situated at said flange 21, on an angular portion thereof.

Figure 5:
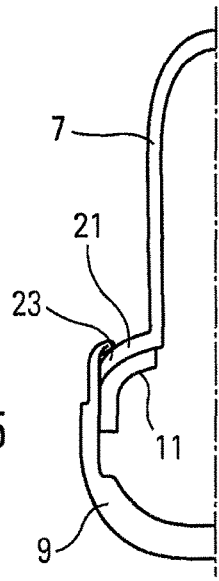
Figure 6:
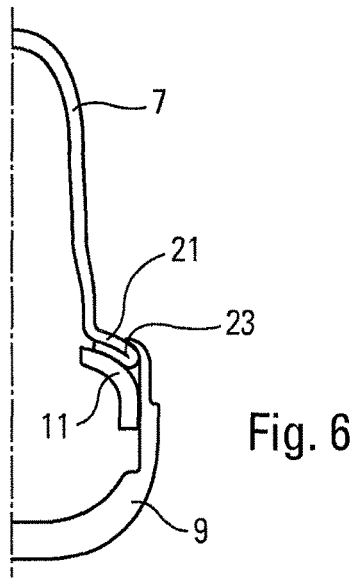

The cover 11 here has, as mentioned above, a collar 19 which delimits said passage orifice 17 and is intended to be received by said end opening of the tube, but such a collar can be eliminated as shown in FIGS. 5 and 6. Said flange 21 of the tube is then placed directly on the cover around the passage orifice 17 of the cover.

Said end of the tube can be flared, as in the example shown in FIG. 1, so that it can be fitted around the collar 19.

Said outer edges 23 are here the rounded parts opposite the flange 21 and furthest away from the median plane P of the collector. Said outer edges could also have an extended surface area, for example ear-shaped, offering a greater surface area for the crimped connection between the collector plate 9 and the cover 11.

Said collar 19 here has a wall of reduced thickness in relation to that of said cover 11, so as to maximise the section of said fluid circulation orifice 17 and reduce the internal head loss from passage of the fluid.

As has already been stated, in order to obtain an appropriate pre-assembly placing of the cover 11 on the collector plate 9, the wall 9a of said plate is here provided with internal stops 13 designed to receive the longitudinal edges 11d of said cover.

The external face of the wall 11a of said cover is coated with a plating of material intended for the subsequent brazing for connecting said cover to the collector plate and the tube.

A method for assembling a heat exchanger according to the invention, having a single connecting tube 7, will now be described.

The method essentially comprises the steps of shaping the connecting tube 7 to the exchanger by outer edges 23 complementary to the outer surface of the cover 11 at the orifice 17 for passage of the fluid into the collector, positioning the tube 7 on the fluid passage orifice 17 of the cover, then folding the lateral wings 9c of the collector plate onto the cover in order to close the cover on the collector plate, and crimping the tube to the cover thus allowing pre-assembly of the exchanger before it is assembled. This assembly is performed, for example, by passing through a brazing furnace.

The invention thus provides a connection solution for heat exchangers, in particular those of the "two-part" type in certain configurations, in particular crowded configurations, where installing a flange fitted to the collector is difficult, or cannot even be considered.

The invention claimed is:

1. A heat exchanger (1) comprising at least one tube (7) for the passage of fluid F and at least one collector (5) provided with a cover (11) which closes, after assembly, a longitudinal opening (10) in a collector plate (9) cooperating with the cover (11) to form the collector (5), the tube (7) being intended to form a connecting element of the heat exchanger (1) and having an end partially crimped between the cover (11) and the collector plate (9) at an orifice (17) for the passage of the fluid F into the collector (5), wherein the cover (11) has a collar (19) which delimits the orifice (17) and is intended to be received by the end of the tube (7).

2. A heat exchanger (1) according to claim 1, wherein the tube (7) is provided at its other end with a connecting element (22) for connecting the heat exchanger (1).

3. A heat exchanger (1) according to claim 1, wherein the collector plate (9) is designed to produce the crimping of outer edges (23) of the tube (7) on the cover (11) while placing the tube (7) in fluid communication with the orifice (17).

4. A heat exchanger (1) according to claim 1, wherein the crimping of the tube (7) on the cover (11) is produced by contacting parallel edges (9d), delimiting the longitudinal opening in the collector plate (9), against the outer edges (23) of the tube (7).

5. A heat exchanger (1) according to claim 3, wherein the outer edges (23) are produced by a deformation of the end of the tube (7).

6. A heat exchanger (1) according to claim 3, wherein the tube (7) comprises a flange (21) shaped to bear, by at least a portion of the flange (21), on the cover (11) in a planar manner, the flange comprising the outer edges (23).

7. A heat exchanger (1) according to claim 1, wherein the flange (21) is folded.

8. A heat exchanger (1) according to claim 6, wherein the flange (21) is fitted to a tubular part (18) forming a main body of the tube (7).

9. A heat exchanger (1) according to claim 6, wherein the flange (21) has a single or a double thickness.

10. A heat exchanger (1) according to claim 3, wherein the thickness of the outer edges (23) corresponds substantially to that of the cover (11).

11. A heat exchanger (1) according to claim 1, wherein end of the tube (7) is flared.

12. A method for assembling a heat exchanger (1) comprising at least one tube (7) for the passage of fluid F and at least one collector (5) provided with a cover (11) which closes, after assembly, a longitudinal opening (10) in a collector plate (9) cooperating with the cover (11) to form the collector (5), the tube (7) being intended to form a connecting element of the heat exchanger (1) and having an end partially crimped between the cover (11) and the collector plate (9) at an orifice (17) for the passage of the fluid F into the collector (5), comprising the steps of:
　　shaping the connecting tube (7) in a manner complementary to the outer surface of the cover (11) at the orifice (17) for the passage of the fluid F into the collector (5);
　　positioning the tube (7) on the orifice (17) in the cover (11) for the passage of fluid, then
　　folding lateral wings (9c) of the collector plate (9) onto the cover (11) in order to close the cover (11) on the collector plate (9) and crimping the tube (7) to the cover (11), thus allowing pre-assembly of the heat exchanger (1) before the heat exchanger (1) is assembled.

13. A heat exchanger (1) according to claim 2, wherein the collector plate (9) is designed to produce the crimping of outer edges (23) of the tube (7) on the cover (11) while placing the tube (7) in fluid communication with the orifice (17).

14. A heat exchanger (1) according to claim 4, wherein the outer edges (23) are produced by a deformation of the end of the tube (7).

15. A heat exchanger (1) according to claim 4, wherein the tube (7) comprises a flange (21) shaped to bear, by at least a portion of the flange (21), on the cover (11) in a planar manner, the flange comprising the outer edges (23).

16. A heat exchanger (1) according to claim 10, wherein the thickness of the outer edges (23) is in the range between 0.8 and 1.2 mm.

\* \* \* \* \*